US000001822H

United States Statutory Invention Registration [19]

[11] Reg. Number: H1,822

Kelley et al.

[45] Published: Dec. 7, 1999

[54] MINIATURE JOYSTICK MOUNTED ON A JOYSTICK

[75] Inventors: Craig B. Kelley, Dunlap; Daniel E. Shearer; Susan M. Boast, both of Metamora, all of Ill.

[73] Assignee: Caterpillar Inc., Peoria, Ill.

[21] Appl. No.: 09/213,050

[22] Filed: Dec. 16, 1998

[51] Int. Cl.[6] ..... B60K 26/00

[52] U.S. Cl. ..... 180/333; 74/471 XY

[56] References Cited

U.S. PATENT DOCUMENTS

| | | | |
|---|---|---|---|
| 3,897,805 | 8/1975 | Casey | 137/637 |
| 3,967,086 | 6/1976 | Bauer | 200/328 |
| 4,584,510 | 4/1986 | Hollow | 318/584 |
| 4,748,441 | 5/1988 | Brzezinski | 340/709 |
| 5,042,314 | 8/1991 | Rytter et al. | 74/335 |
| 5,541,622 | 7/1996 | Engle et al. | 345/161 |

*Primary Examiner*—Harold J. Tudor
*Attorney, Agent, or Firm*—Kevin M. Kercher

[57] ABSTRACT

A hand-operated dual joystick for a motor grader is disclosed. The dual joystick comprises a first joystick having a ledge and a switch, and a second joystick that is significantly smaller than the first joystick. The second joystick is mounted to the ledge of the first joystick. The first joystick is moveable along a first axis and a second axis that are perpendicular to each other. In addition, the first joystick is rotatable about a third axis that is perpendicular to the first axis and to the second axis. The second joystick is moveable along the first axis and the second axis. Movement of the first joystick and the second joystick is used to control a plurality of motor grader functions. The dual function joystick permits an operator to control a plurality of the motor grader functions from a single location thus reducing operator fatigue.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MINIATURE JOYSTICK MOUNTED ON A JOYSTICK

TECHNICAL FIELD

This invention relates generally to a motor grader and specifically to a miniature joystick mounted on a regular joystick for controlling a plurality of functions on a motor grader.

BACKGROUND ART

This invention relates generally to a miniature joystick mounted on a regular joystick for controlling a variety of functions of the motor grader.

Motor graders include many hand-operated controls to perform functions such as steering the grader, positioning an implement or a blade in several orientations, and articulating the frame of the grader.

Current motor graders require numerous hand-operated controls because typically each hand-operated control is used to control only one or two functions. Often, the operator of the motor grader must steer the grader while performing many other functions, such as adjusting the blade tip, adjusting the blade angle relative to the frame, and adjusting the articulation of the grader frame. Because the typical hand-operated controls are spaced apart, performing all of these functions simultaneously is difficult, inefficient, and fatiguing for the operator. To reduce difficulty, increase efficiency, and reduce operator fatigue, it is desirable to provide an apparatus that permits an operator to rapidly and easily control a plurality of functions from a single hand location. Also it is desirable to provide an apparatus that is ergonomically advantageous for controlling this plurality of functions.

DISCLOSURE OF THE INVENTION

The present invention provides a miniature joystick mounted on a regular joystick with both joysticks controlling a variety of functions of a motor grader.

In a first embodiment, a hand-operated control for a motor grader comprises a dual joystick having a first joystick and second joystick. The first joystick includes a control switch and a ledge. The second joystick is significantly smaller than the first joystick and is mounted on the ledge of the first joystick. In a preferred embodiment, the first joystick is movable on a first axis and a second axis wherein the first axis is perpendicular to the second axis. The first joystick is also rotatable about a third axis that is perpendicular to both the first axis and the second axis. In a preferred embodiment, movement of the first joystick on the first axis, second axis, or about the third axis generates a plurality of electrical input signals that are detected by an electrical control computer.

BEST MODE FOR CARRYING OUT THE INVENTION

Figure 1:
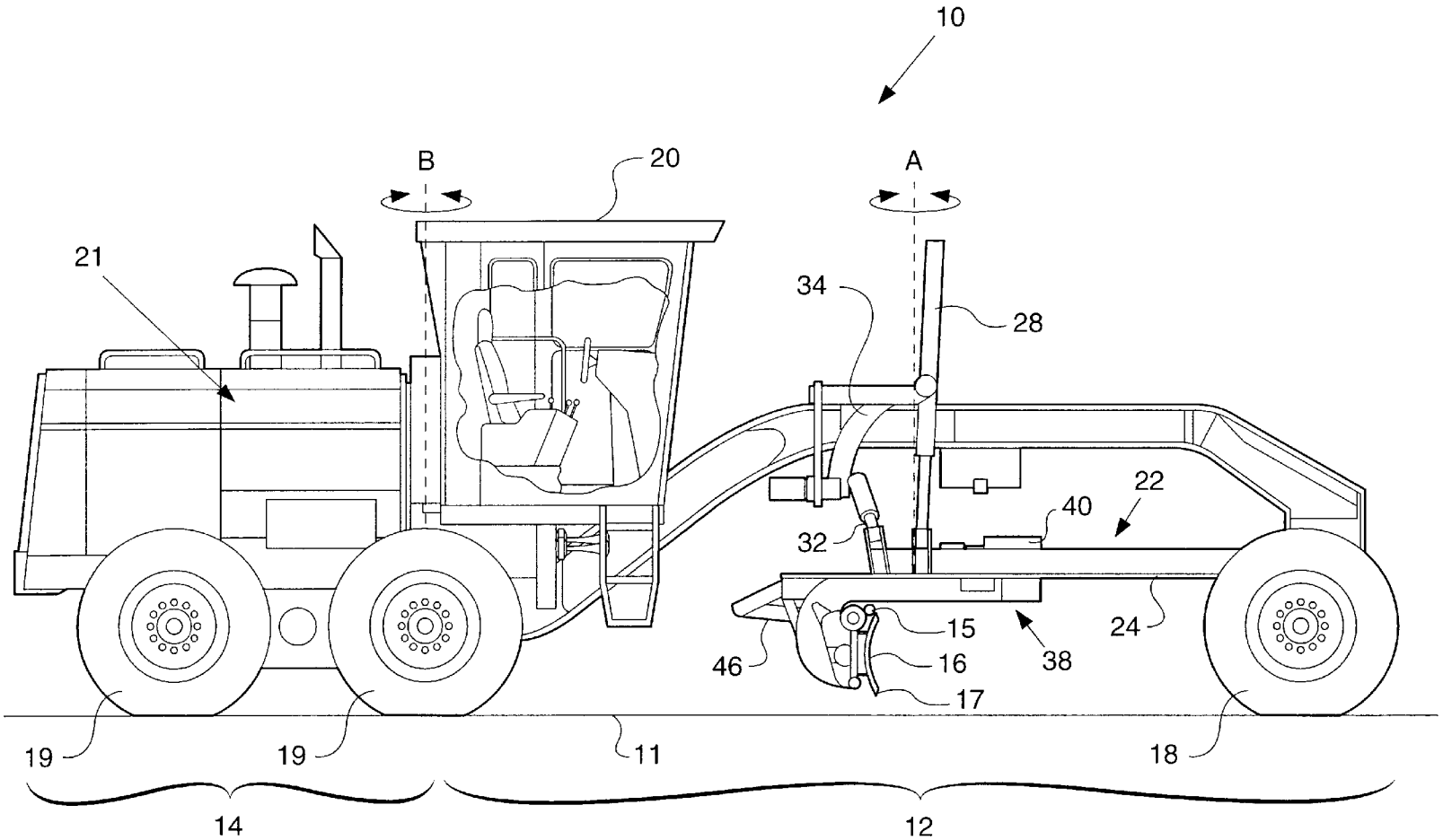
FIG. 1 is a side view of a motor grader.
Figure 2:
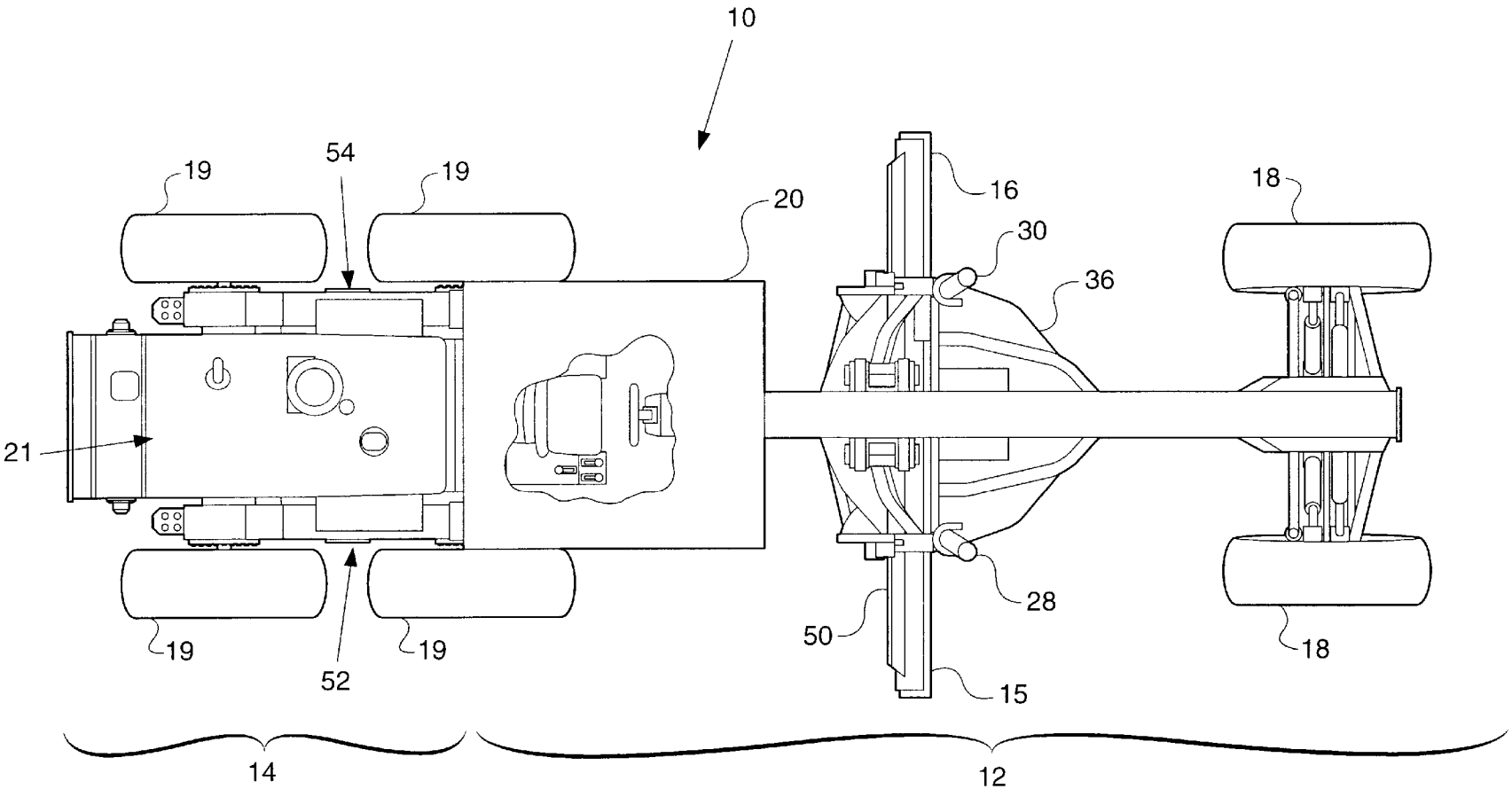
FIG. 2 is a top view of the motor grader.

Referring to the Figures, wherein like numerals indicate like or corresponding parts throughout the several views, a motor grader is shown generally at 10 in FIGS. 1 and 2. The motor grader 10 is used primarily as a finishing tool to sculpt a surface of earth 11 to a final arrangement. Rather than moving large quantities of earth in the direction of travel like other machines, such as a bulldozer, the motor grader 10 moves relatively small quantities of earth from side to side.

The motor grader 10 includes a front frame 12, a rear frame 14, and a blade 16 having a top 15 and a cutting edge 17. The front and rear frames 12 and 14 are supported by front tires 18 and rear tires 19. An operator cab 20 containing the many controls necessary to operate the motor grader 10 is mounted on the front frame 12. An engine, shown generally at 21, is used to drive or power the motor grader 10. The engine 21 is mounted on the rear frame 14. The blade 16, sometimes referred to as a moldboard, is used to move earth. The blade 16 is mounted on a linkage assembly shown generally at 22. The linkage assembly 22 allows the blade 16 to be moved to a variety of different positions with respect to the motor grader 10. Starting at the front of the motor grader 10 and working rearward toward the blade 16, the linkage assembly 22 includes a drawbar 24.

The drawbar 24 is mounted to the front frame 12 with a ball joint. The position of the drawbar 24 is controlled by three hydraulic cylinders, commonly referred to as a right lift cylinder 28, a left lift cylinder 30, and a center shift cylinder 32. A coupling, shown generally at 34, connects the three cylinders 28, 30, and 32 to the front frame 12. The coupling 34 can be moved during blade repositioning but is fixed stationary during earthmoving operations. The height of the blade 16 with respect to the surface of earth 11 below the motor grader 10, commonly referred to as the blade height, is controlled primarily with the right lift cylinder 28 and the left lift cylinder 30. Each lift cylinder, 28 and 30, functions to raise and lower the associated end of the blade 16. Thus, the right lift cylinder 28 raises and lowers the right end of blade 16 and the left lift cylinder 30 raises and lowers the left end of blade 16. The center shift cylinder 32 moves the drawbar 24 from side to side relative to the front frame 12.

The drawbar 24 includes a large, flat plate commonly referred to as a yoke plate 36, as shown in FIG. 2. Beneath the yoke plate 36 is a large gear, commonly referred to as a circle 38. The circle 38 is rotated by a hydraulic motor commonly referred to as a circle drive 40, as shown in FIG. 1. Rotation of the circle 38 by the circle drive 40 pivots the blade 16 about an axis A fixed to the drawbar 24. The blade 16 is mounted to a hinge (not shown) on the circle 38 with a bracket (not shown). A hydraulic blade tip cylinder 46 is used to pitch the bracket forward or rearward and thus pitch the top 15 of the blade 16 forward and rearward relative to the cutting edge 17. The blade 16 is mounted to a sliding joint in the bracket allowing the blade 16 to be slid or shifted from side to side with respect to the bracket. A hydraulic side shift cylinder 50, shown in FIG. 2, is used to control the side to side shift of the blade 16.

Referring now to FIG. 2, a right articulation cylinder, shown generally at 52, is mounted to the right side of the rear frame 14 and a left articulation cylinder, shown generally at 54, is mounted to the left side of the rear frame 14. The right and left articulation cylinders 52 and 54 are hydraulic and used to rotate the front frame 12 about an axis B shown in FIG. 1. The axis B is commonly referred to as the articulation axis. In FIG. 2, the motor grader 10 is positioned in a neutral or zero articulation angle. The rear tires 19 are driven by a differential (not shown) as is well known in the art. The rear tires 19 on each side are geared to each other and are driven in synchrony by the differential. The motor grader 10 includes a differential lock mechanism (not shown) as is known in the art. Preferably, the differential lock mechanism is turned off and on by a control switch 96 (see FIG. 4). The differential lock locks the differential so that it drives both the right rear tires 19 and the left rear tires 19 even during a loss in traction and thus provides better traction as is known in the art.

Figure 3:
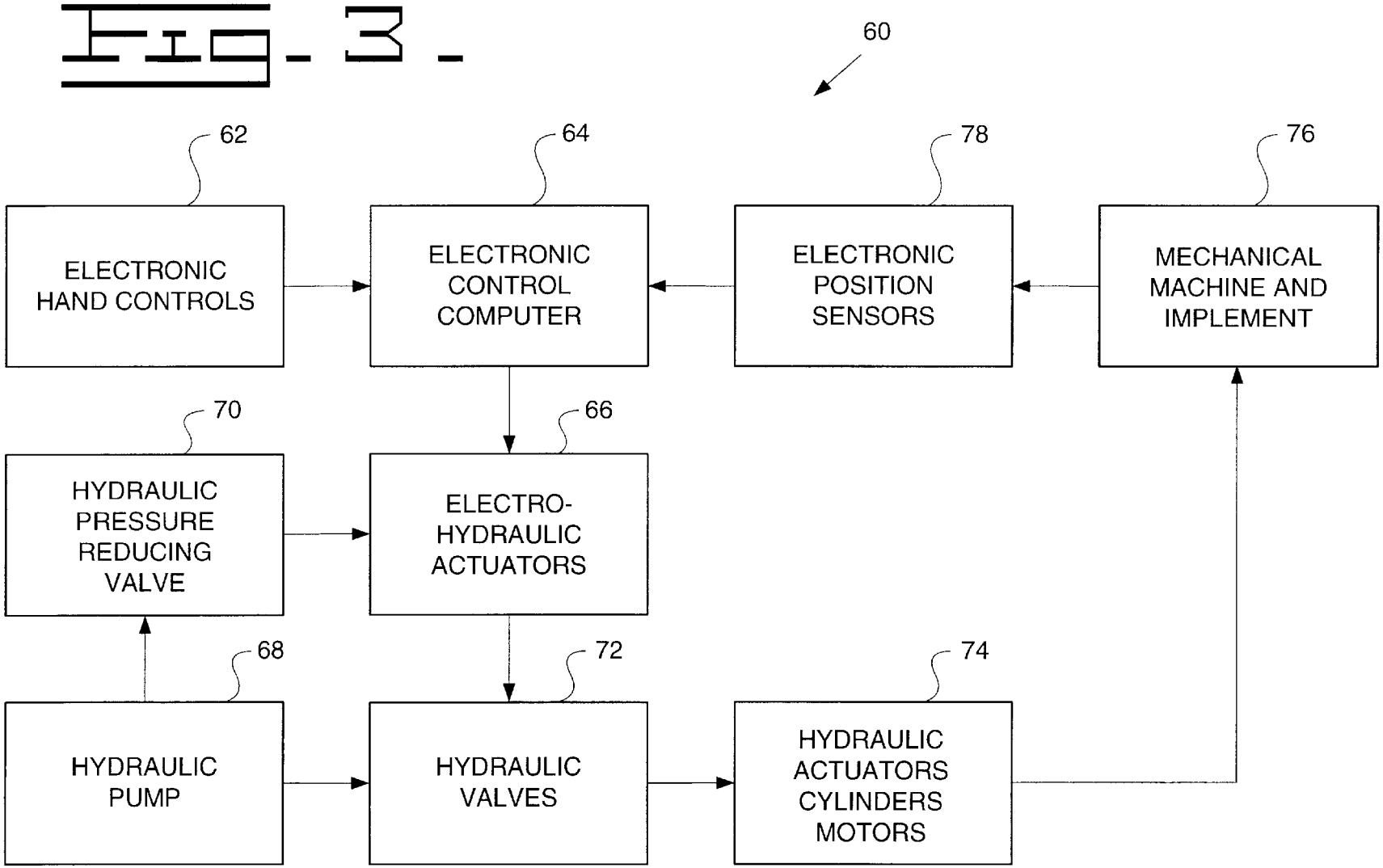
FIG. 3 is a schematic block diagram of an electro-hydraulic control system for the motor grader.

FIG. 3 is a schematic block diagram of an electro-hydraulic control system 60 for the motor grader 10. The control system 60 is designed to operate the various hydraulic controls of the motor grader 10 described above. The system 60 includes electronic hand controls represented by block 62, which transform the actions of an operator's hands on controls such as dual joystick 90 (see FIG. 4) into a plurality of electrical input signals. These input signals carry operational information to an electronic control computer, represented by block 64.

The control computer 64 receives the electrical input signals produced by the hand controls 62, processes the operational information carried by the input signals, and transmits a plurality of control signals to a plurality of drive solenoids, each of which is located in an electro-hydraulic actuator, represented by block 66.

The hydraulic portion of the control system 60 requires both high hydraulic pressure and low pilot pressure. High hydraulic pressure is provided by a hydraulic pump, represented by block 68. The hydraulic pump 68 receives a rotary motion, typically from the engine 21 of the motor grader 10, and produces high hydraulic pressure. Low pilot pressure is provided by a hydraulic pressure reducing valve, represented by block 70. The hydraulic pressure reducing valve 70 receives high hydraulic pressure from the hydraulic pump 68 and supplies low pilot pressure to the electro-hydraulic actuators 66.

Each electro-hydraulic actuator 66 includes an electrical drive solenoid and a hydraulic valve. The solenoid receives control signals from the electronic control computer 64 and produces a controlled mechanical movement of a core stem of the actuator 66. The hydraulic valve receives both the controlled mechanical movement of the core stem of the actuator 66 and low pilot pressure from the hydraulic pressure reducing valve 70 and produces controlled pilot hydraulic pressure for hydraulic valves, represented by block 72.

The hydraulic valves 72 receive both controlled pilot hydraulic pressure from the electro-hydraulic actuators 66 and high hydraulic pressure from the hydraulic pump 68 and produce controlled high hydraulic pressure for hydraulic actuators, cylinders, and motors, represented by block 74.

The hydraulic actuators, cylinders, and motors 74 receive controlled high hydraulic pressure from the hydraulic valves 72 and produce mechanical force to move the front frame 12 of the grader 10 and several mechanical linkages, represented by block 76. As described above, movement of the front frame 12 of the grader 10 with respect to the rear frame 14 of the grader 10 establishes the articulation angle. Movement of the mechanical linkages establishes the position of the blade 16 or other implements.

Figure 4:
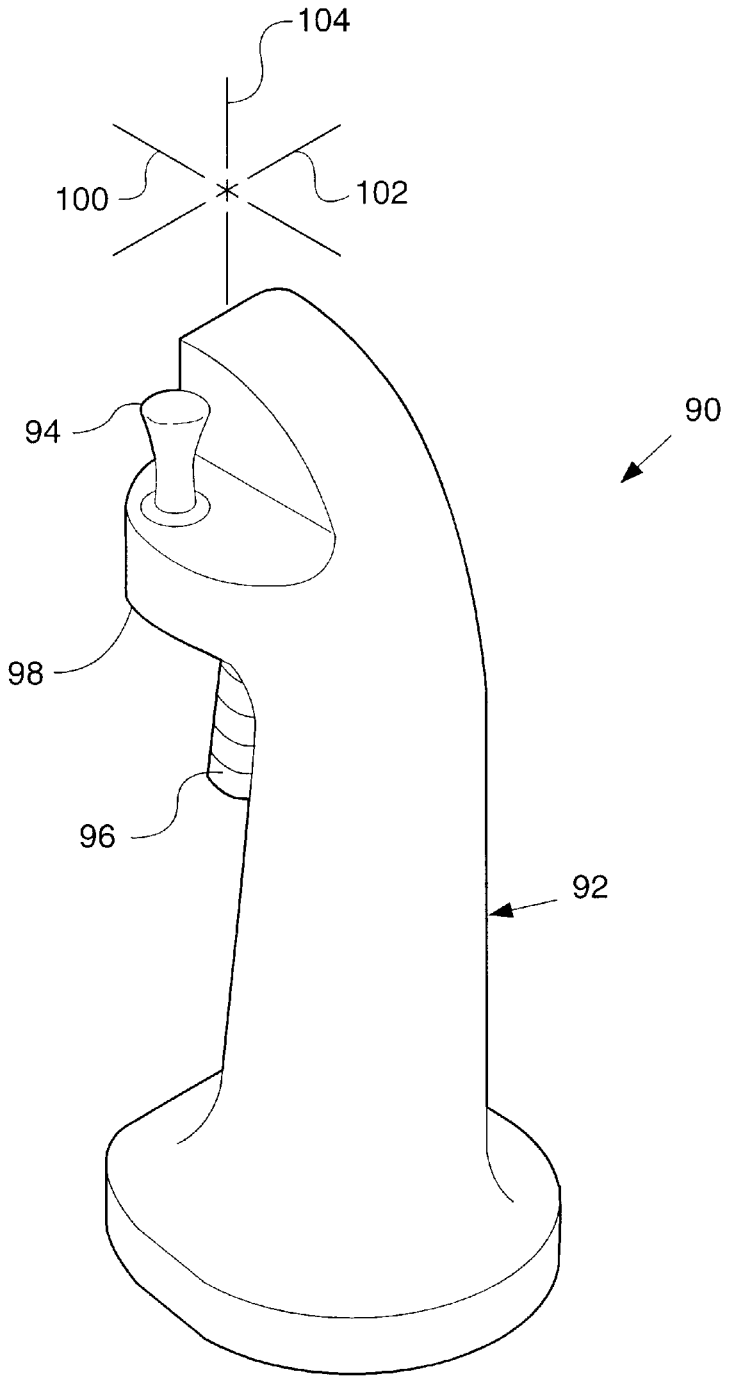
FIG. 4 is a side perspective view of a dual joystick designed in accordance with the present invention.

Each hydraulic actuator, cylinder, and motor 74, such as the lift cylinders 28 and 30 and the circle drive motor 40, includes an electronic position sensor, represented by block 78. The electronic position sensors 78 transmit information regarding the position of its respective hydraulic actuator, cylinder, or motor 76 to the electronic control computer 64. In this manner, the control computer 64 can determine the articulation angle of the grader 10 and position the blade 16. With such information, the control computer 64 can perform additional operations. 1. FIG. 4 is a side perspective view of a dual joystick shown generally at 90. Dual joystick 90 comprises a first joystick 92 and a second joystick 94. Second joystick 94 is significantly smaller than first joystick 92. A control switch 96 is mounted to a front portion of first joystick 92. Preferably, control switch 96 is an on off switch that is used to control the status of the differential lock described above. First joystick 92 includes a ledge 98 and second joystick 94 is mounted to ledge 98. Ledge 98 serves to guide an operator's thumb to second joystick 94 without the need for the operator to look at first joystick 92. First joystick 92 is movable on a first axis 100 and a second axis 102. First axis 100 is perpendicular to second axis 102. In addition, first joystick 92 is rotatable about a third axis 104 that is perpendicular to both first axis 100 and second axis 102. Movement of first joystick 92 on any of the axes produces an electrical input signal that is received by the electronic control computer 64.

Second joystick 94 is also movable along first axis 100 and second axis 102 and produces electrical input signals that are transmitted to the electronic control computer 64. Preferably, second joystick 94 comprises an isometric joystick wherein the actual joystick moves a very short distance when moved through its full range of motion. With such a joystick the electrical input signal produced by the joystick is largely controlled by the force with which the joystick is moved in a given direction. A suitable example of second joystick 94 is Model 462 Subminiature Joystick available from Measurement Systems, Inc.

As would be understood by one of ordinary skill in the art, both first joystick 92 and second joystick 94 can also be moved along axes that are intermediate between first axis 100 and second axis 102. Movement of either the first joystick 92 or the second joystick 94 along one of these intermediate axes produces a combination electrical input signal that reflects proportionally the angle of movement of the joystick between the first axis 100 and the second axis 102.

As discussed above, movement of either first joystick 92 or second joystick 94 generates an electrical input signal that is received by electronic control computer 64. These input signals can be utilized to control a variety of functions on motor grader 10 through the hydraulic actuators, hydraulic cylinders, and hydraulic motors represented by block 74 in FIG. 3. By way of example only, movement of first joystick 92 on first axis 100 may be used to simultaneously activate right lift cylinder 28 and left lift cylinder 30 to accomplish a uniform lifting of blade 16. Movement of first joystick 92 along second axis 102 can be utilized to generate control signals that actuate side shift cylinder 50 thereby shifting blade 16 from one side of frame 12 to the other side of frame 12. Movement of first joystick 92 on an axis intermediate between first axis 100 and second axis 102 would simultaneously activate both right lift cylinder 28 and left lift cylinder 30 to accomplish a uniform lifting of blade 16 and actuate side shift cylinder 50 thereby shifting blade 16 from one side of frame 12 to the other side of frame 12. Rotation of first joystick 92 about third axis 104 may be used to generate a control signal for activating circle drive 40 and thereby rotating blade 16 about axis A. Movement of second joystick 94 along first axis 100 may be used to activate hydraulic blade tip cylinder 46 and thereby move top 15 of blade 16 relative to cutting edge 17. Likewise, movement of second joystick 94 along second axis 102 may be used to generate a control signal for actuating center shift cylinder 32 thereby moving drawbar 24 relative to frame 12. As would be understood by one of ordinary skill in the art, movement of either first joystick 92 or second joystick 94 along any one of first axis 100, second axis 102, and third axis 103 could be used to perform other functions of a motor grader 10.

INDUSTRIAL APPLICABILITY

The present invention relates generally to a hand-operated control for performing a variety of functions on a motor grader 10. In the present invention, a dual joystick 90 incorporates a first joystick 92 and a second joystick 94. The second joystick 94 is significantly smaller than the first joystick 92. First joystick 92 also includes a ledge 98. Second joystick 94 is mounted to ledge. First joystick 92 further incorporates switch 96 for controlling a differential lock mechanism. Mounting of second joystick 94 on first joystick 92 permits dual joystick 90 to provide ergonomically advantageous control of a plurality of functions of motor grader 10 to an operator.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A hand-operated control for a motor grader comprising:

a dual joystick having a first joystick and a second joystick;

said first joystick including a control switch and a ledge; and said second joystick being significantly smaller than said first joystick and mounted on said ledge of said first joystick.

2. A hand-operated control for a motor grader as recited in claim 1 further comprising an electronic control computer and wherein said first joystick is movable on a first axis and a second axis;

said first axis perpendicular to said second axis;

said first joystick rotatable about a third axis, said third axis perpendicular to both said first axis and said second axis; and movement of said first joystick on said first axis, said second axis, or about said third axis generating a plurality of electrical input signals, said plurality of electrical input signals detected by said electronic control computer.

3. A hand-operated control for a motor grader as recited in claim 2 further comprising a plurality of electro-hydraulic actuators each having a drive solenoid wherein said electronic control computer generates a control signal in response to each of said input signals, said electronic control computer transmitting said control signal to at least one of said electro-hydraulic actuators.

4. A hand-operated control for a motor grader as recited in claim 3 further comprising a hydraulic right lift cylinder and a hydraulic left lift cylinder, each of said hydraulic right lift cylinder and said hydraulic left lift cylinder associated with at least one of said plurality of electro-hydraulic actuators and wherein said electronic control computer transmits one of said control signals to each of said associated electro-hydraulic actuators of said hydraulic right lift cylinder and said hydraulic left lift cylinder in response to movement of said first joystick on said first axis.

5. A hand-operated control for a motor grader as recited in claim 3 further comprising a hydraulic side shift cylinder, said hydraulic side shift cylinder associated with at least one of said plurality of electro-hydraulic actuators and wherein said electronic control computer transmits one of said control signals to said associated electro-hydraulic actuator of said hydraulic side shift cylinder in response to movement of said first joystick on said second axis.

6. A hand-operated control for a motor grader as recited in claim 3 further comprising a hydraulic circle drive, said hydraulic circle drive associated with at least one of said plurality of electro-hydraulic actuators and wherein said electronic control computer transmits one of said control signals to said associated electro-hydraulic actuator of said hydraulic circle drive in response to rotation of said first joystick about said third axis.

7. A hand-operated control for a motor grader as recited in claim 1 further comprising an electronic control computer and wherein said second joystick is movable on a first axis and a second axis;

said first axis perpendicular to said second axis; and movement of said second joystick on said first axis or said second axis generating a plurality of electrical input signals, said plurality of electrical input signals detected by said electronic control computer.

8. A hand-operated control for a motor grader as recited in claim 7 further comprising a plurality of electro-hydraulic actuators each having a drive solenoid wherein said electronic control computer generates a control signal in response to each of said input signals, said electronic control computer transmitting said control signal to at least one of said electro-hydraulic actuators.

9. A hand-operated control for a motor grader as recited in claim 8 further comprising a hydraulic blade tip cylinder, said hydraulic blade tip cylinder associated with at least one of said plurality of electro-hydraulic actuators and wherein said electronic control computer transmits one of said control signals to said associated electro-hydraulic actuator of said hydraulic blade tip cylinder in response to movement of said second joystick on said first axis.

10. A hand-operated control for a motor grader as recited in claim 8 further comprising a hydraulic center shift cylinder, said hydraulic center shift cylinder associated with at least one of said plurality of electro-hydraulic actuators and wherein said electronic control computer transmits one of said control signals to said associated electro-hydraulic actuator of said hydraulic center shift cylinder in response to movement of said second joystick on said second axis.

* * * * *